United States Patent [19]

Reimert

[11] Patent Number: 4,830,408
[45] Date of Patent: May 16, 1989

[54] CONNECTOR ASSEMBLY
[75] Inventor: Larry E. Reimert, Houston, Tex.
[73] Assignee: Dril-Quip, Inc., Houston, Tex.
[21] Appl. No.: 270,924
[22] Filed: Jun. 5, 1981
[51] Int. Cl.⁴ ............................................... F16L 35/00
[52] U.S. Cl. .................................... 285/27; 285/321; 285/308; 285/403
[58] Field of Search .................. 285/308, 321, 231, 5, 285/24, 27, 347, 399, 403, 322, 323, 317, DIG. 7; 403/11, 13, 361

[56] References Cited
U.S. PATENT DOCUMENTS

| | | | |
|---|---|---|---|
| 2,121,769 | 6/1938 | Statz | 403/361 |
| 3,107,930 | 9/1959 | Gibbs et al. | |
| 3,345,084 | 2/1965 | Hanes et al. | |
| 3,345,085 | 10/1967 | Hanes | 285/27 |
| 3,345,087 | 10/1967 | Hanes et al. | 285/321 X |
| 3,381,983 | 8/1965 | Hanes | |
| 3,405,956 | 10/1968 | Pierce | 285/321 X |
| 3,455,578 | 11/1965 | Hanes | |
| 3,499,665 | 3/1970 | Conrad | 285/321 X |
| 3,521,911 | 3/1968 | Hanes et al. | |
| 3,540,760 | 11/1970 | Miller | 285/321 |
| 3,920,270 | 11/1975 | Bobb | 285/321 |
| 4,114,928 | 9/1978 | Lochte | |
| 4,120,520 | 10/1978 | Ahlstone | |
| 4,133,563 | 1/1979 | Yamazuki | 285/231 |
| 4,209,193 | 1/1979 | Ahlstone | |
| 4,275,909 | 11/1978 | Yoshizawa | 285/231 X |

FOREIGN PATENT DOCUMENTS

| | | | |
|---|---|---|---|
| 1101904 | 5/1981 | Canada | |
| 541300 | 8/1957 | Italy | 285/231 |
| 1147862 | 4/1969 | United Kingdom | |

Primary Examiner—Dave W. Arola
Attorney, Agent, or Firm—Browning, Bushman, Zamecki & Anderson

[57] ABSTRACT

An improved quick connector substantially simplifies string make-up by eliminating the need for a perfect longitudinal alignment between adjacent sections before engagement. An elongated recess in either the pin or box connector permits the pin to be inserted into the box at an angle. Interaction between the recess face and a surface on the opposite connector causes the pin to automatically align with the box. When the pin reaches its fully engaged position in the box, a spring tension snap lock ring having multiple annular teeth meshes with complementary grooves to lock the pin and box together.

17 Claims, 7 Drawing Sheets

CONNECTOR ASSEMBLY

BACKGROUND OF THE INVENTION

1. Field of the Invention

The present invention relates to pipe connectors, and more particularly to snap lock connectors for use with oil well casing and conductor pipe.

2. Description of Prior Art

When a well is drilled into the earth, as for the production of oil and gas, a large diameter pipe, known as surface casing, is usually installed in the upper section of the borehole. Surface casing stabilizes the walls of the borehole near the surface where they are more apt to cave in. On wells drilled in offshore waters from platforms or jack-up rigs, the pipe further extends from the ocean floor to the deck of the rig and is known as a marine riser. In such case, the riser is an extension of the surface casing. Pipe of this type usually ranges from 20 inches in outside diameter (O.D.) to 42 inches O.D. Some special applications use larger diameter pipe. Casing is usually installed in the ground to depths ranging from 50 to over 1,000 feet, and due to handling requirements is usually provided in lengths of from 30 to 50 feet.

During installation these pipe sections, or joints, must be connected together to provide structural integrity and to prevent leakage of fluids. This can be accomplished either by welding or by a disengagable mechanical type connector. Of these two general methods the mechanical connector is preferred since it requires less time to make a connection. This saves a considerable amount of money since rigs are usually leased on a daily rate. Saving rig time is particularly important offshore where rig rates are much higher than for equivalent land rigs.

Mechanical type connectors are available generally in two types. The first is the screw type in which an externally-threaded end, known as a pin, mates with an internally-threaded section known as a box. The second is the snap-lock type without threads in which the pin is simply pushed into the box where it is secured by a latching mechanism. The latter type is usually preferred for the large, low pressure surface casing string since it is both easier and faster to "stab" the pin into the box than to screw the two sections together.

Snap-lock connectors currently available use a snap ring, which is generally fabricated using spring material and has a gap to permit expansion and contraction. The snap ring is usually disposed in a recess either in the pin or the box, and the other connector has a groove directly opposite therefrom when the two connector ends are fully engaged. When the pin is inserted in the box carrying the snap ring, the snap ring is expanded by a tapering section on the pin until the mating grooves are opposite each other. At that point the expanded ring relaxes and snaps into engagement with the mating groove in the pin. With the ring mounted on the pin, the box causes the ring to contract until the ring can relax and expand into engagement with a groove in the box. The ring bridges the box and pin together and prevents them from disengaging until external actuating forces are placed on the ring and it is either expanded or contracted as appropriate.

Accordingly, it is an object of the present invention to provide a new and improved casing connector for the uses as previously described.

It is another object of the present invention to provide a new and improved type connector for casing, or the like, having increased structural strength. A connector must be strong enough to prevent failure under heavy load or flexture, as when a casing string is buffeted by wave action while being run from a floating vessel.

Another object of the present invention is to provide a pipe connector having pressure integrity to prevent environmental pollution and to prevent loss of costly drilling fluids.

A further object of the invention is to provide a pipe connector having easy stabbing characteristics, which is to say that it must be easy to align two adjacent sections of pipe, or casing, and to insert the pin connector into the box connector. Otherwise considerable time can be lost attempting to maneuver large heavy sections of casing into alignment and connection, particularly on offshore floating rigs where wave action can severely exacerbate the problem.

Yet another object of the invention is to provide a pipe connector having a mechanism for securing two sections of pipe together that operates quickly. This is important in achieving the aforementioned goal of saving valuable rig time.

Still another object of the invention is to provide a pipe connector having a compact locking mechanism without sacrificing either structural strength or gripping capacity. Conventional locking rings require wide cross sections to provide both requisite structural strength and gripping capacity, thereby requiring excessively large and costly joints.

Other objects and advantages of the invention will become apparent from a reading of the attached claims and description of the preferred embodiments.

SUMMARY OF THE INVENTION

These and other objects of the present invention are accomplished by providing two generally tubular connector sections or members, one of which is sized to be positioned inside the other. The two connectors are shaped to provide a concavity between the two when the one connector section is positioned inside the other, thereby permitting the smaller connector section to be inserted into the larger without substantial longitudinal alignment therebetween. Also included are means for securing the two connector members together comprising a snap-lock ring. More particularly the concavity is configured as an elongated recess having an inner surface comprising two cone frustra with their smaller diameter ends generally adjacent each other in one embodiment of the invention. The first conical section permits the smaller connector to be inserted into the larger without substantial longitudinal alignment of the two connectors, and the second conical section automatically forces the two connectors into mutual alignment as the smaller tubular section is further inserted into the larger.

The invention further provides sealing means between the larger and smaller connector sections and gripping means comprising a spring snap-lock ring disposed in an annular recess in the side of one of the connector sections. The snap lock ring has a multiplicity of annular teeth on one face thereof, and the teeth are shallow relative to their width. The teeth are positioned to mesh with a multiplicity of annular recesses in the other connector member, thereby to bridge the first and second connector members and secure them together.

BRIEF DESCRIPTION OF THE DRAWINGS

The invention may be better understood by reading the attached description of preferred embodiments in conjunction with the attached drawings wherein.

DESCRIPTION OF PREFERRED EMBODIMENTS

Figure 1:
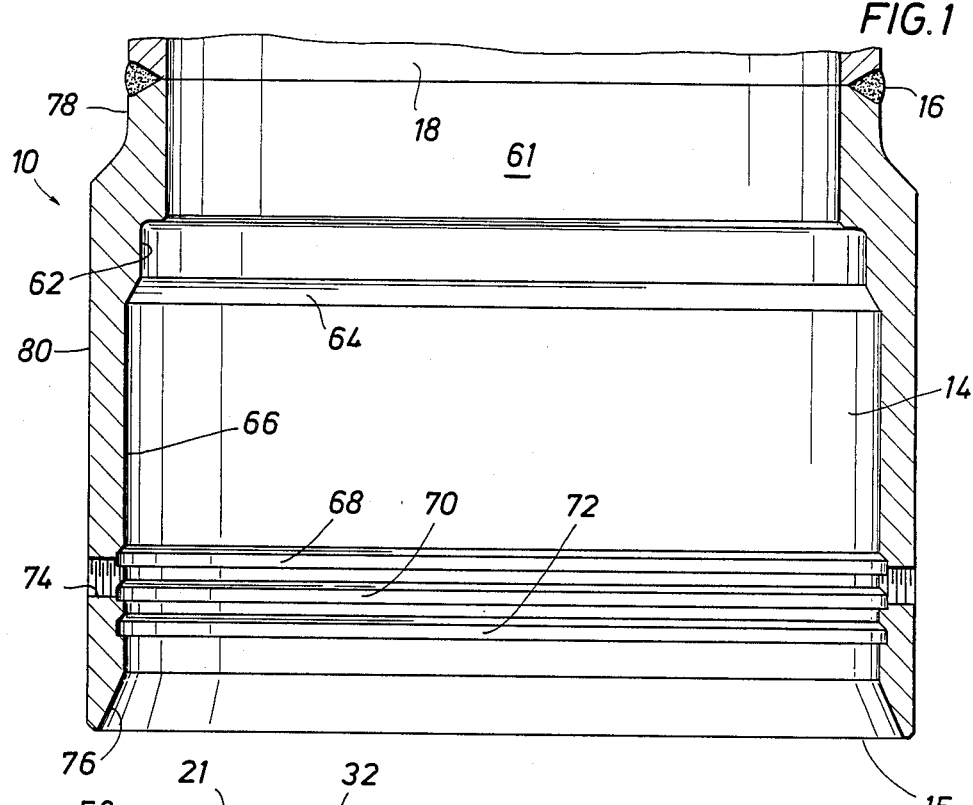
FIG. 1 is a longitudinal cross section of a box type connector in accordance with a first embodiment of the invention.
Figure 2:
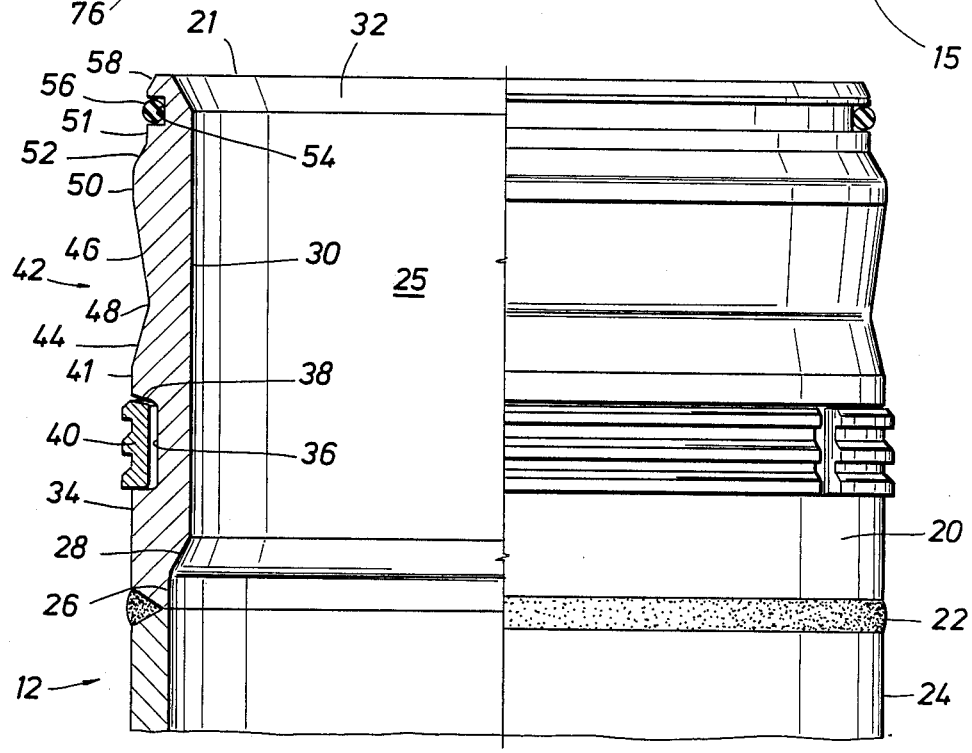
FIG. 2 is a longitudinal quarter section of a pin connector for insertion into the box connector of FIG. 1.
Figure 5:
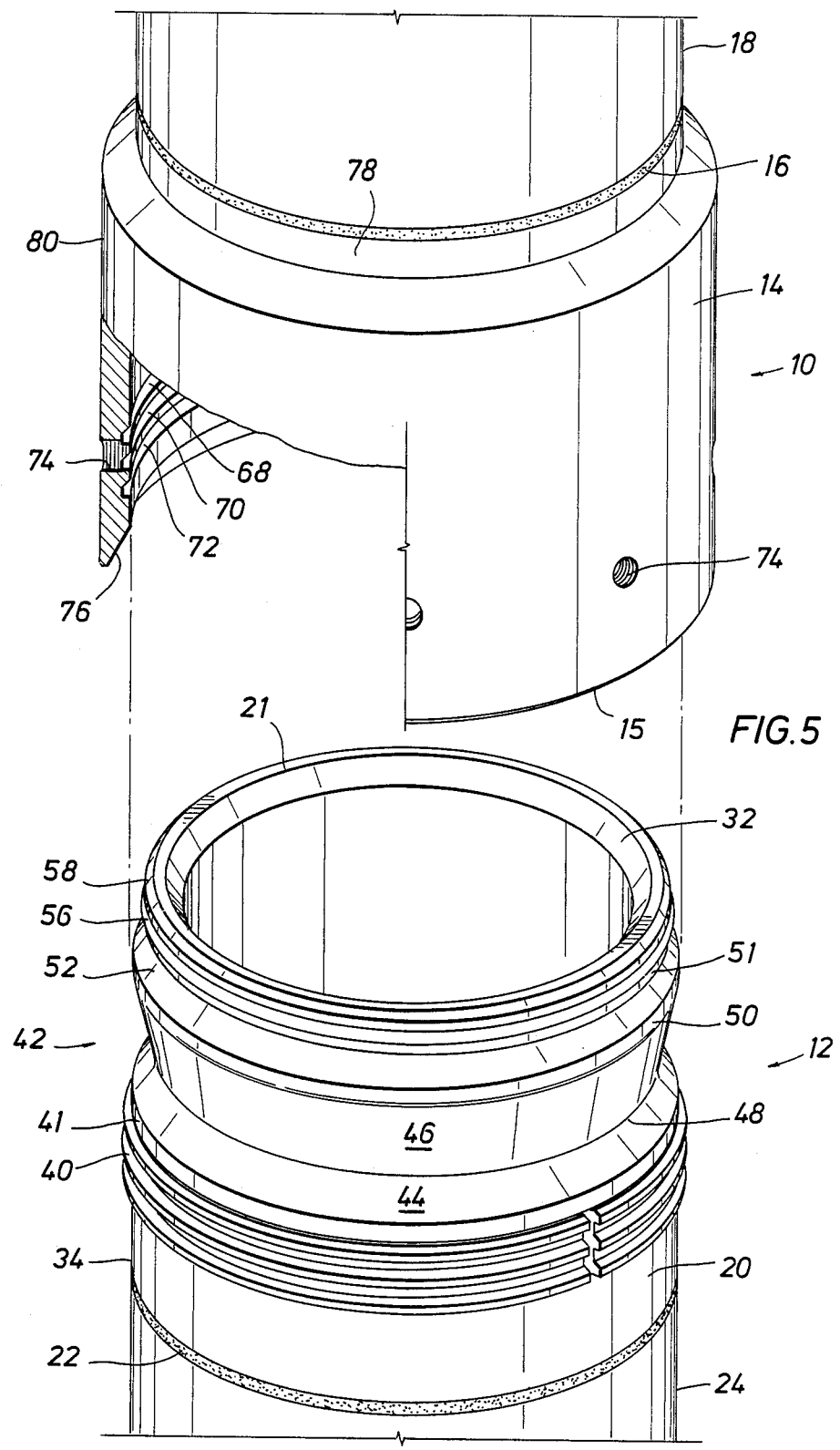
FIG. 5 is a perspective in partial longitudinal section of the connectors shown in FIGS. 1 and 2.

Referring to FIGS. 1 and 2, a first embodiment of the invention is shown. Reference may also be made to FIG. 5 for a perspective view of the apparatus of FIGS. 1 and 2. A joint of casing, or pipe, is shown generally at 10 (in FIG. 1) aligned with and ready for attachment to the end of a second joint of casing shown generally at 12 (in FIG. 2). Casing 10 may be any standard size, but the present invention is most useful for larger diameter casing in the 20 to 42 inch and larger O.D. range. Casing joint 10 comprises a box-type tool joint 14 open on one end 15 and connected by weld material 16 to a tubular section 18. Casing joint 12 comprises a pin-type tool joint 20 open on one end 21 and connected by weld material 22 to a tubular section 24. Although only one end portion of each of casing joints 10 and 12 is shown in FIGS. 1 and 2, it should be understood that each joint may be from 30 to 50 feet long, and each joint may have a box connector 14 on one end and a pin connector 20 on the other end. Successive joints of casing may thus be joined together in a pin-in-box arrangement to form long strings of casing necessary to drilling and production operations.

Referring now to FIG. 2, pin connector 20 is generally tubular in shape, defining an annulus 25. The inside diameter of the section 26 of the pin 20 is the same as that of tubular section 24 at the point where the pin and the tubular section are joined together by the weld 22. Nearer to open end 21 is a transition section 28 which defines a void in annulus 25 in the shape of the frustum of a cone, the smaller diameter of which is nearest end 21. Next toward the open end 21 is a constant diameter section 30 which defines a void in the shape of a cylinder. At the open end 21 is an entry section 32, which defines another void in the shape of a frustum of a cone, the larger diameter of which is nearest open end 21.

The external surface of pin 20 at a first section 34 has approximately the same diameter as that of tubular section 20 in the area adjacent weld 22. Adjacent section 34 is an annular recess 36 generally rectangular in cross section except that the upper lip 38 of the recess is bevelled to form an obtuse angle with the inner face of the recess. Recess 36 is shaped to receive a snap-lock ring 40, which will be discussed in detail in connection with FIG. 3. Nearer open end 21, and separated from the recess 36 by a cylindrical portion 41 of diameter equal to that of section 34, is another recess, or concavity, shown generally at 42, extending completely about pin 20.

Recess 42 has a lower face 44 in the shape of a frustum of a cone and an upper face 46 also in the shape of a frustum of a cone. The smaller diameter ends of the two frustra 44 and 46 mutually converge to form an annular, rounded trough 48. Upper face 46 is substantially longer than lower face 44, i.e., the height of the aforementioned cone frustum formed by face 46 is substantially larger than that of the cone frustum formed by face 44. This particular shape of recess 42 facilitates the insertion of pin 20 into box 10 (FIG. 1). Larger diameter casing and surface conductor tubing with which the present invention is most useful are difficult to align both laterally and longitudinally. By lateral alignment is meant the positioning of the box end over the pin end, or vice versa, and by longitudinal alignment is meant the positioning of the axis of the first section of casing to be coincident with the axis of the second section to which it is to be connected. Recess 42 reduces the need for perfect alignment, particularly in the longitudinal sense, before the pin and box engage. For example, if the upper section of casing is lowered, usually by means of a cable, onto the lower section and the two are not in perfect lateral alignment, the upper section will contact the lower section and lean, causing longitudinal misalignment. A cylindrical lip 50 is provided beyond the upper end of face 46 to hold the pin 20 in the box 14, when partial insertion is effected. The slope of the upper face 46 then permits the pin to slide on into the box without perfect longitudinal alignment. The degree to which the pin and box can be longitudinally misaligned and still effect a successful insertion is dependent upon the slope of face 46 relative to the center axis of pin 20. The lip 50 is equal in diameter to the cylindrical portion 41 so that the two frustoconical surfaces 44 and 46 originate, at their respective largest sections, from equal diameters.

Near opening 21 of pin connector 20 is a cylindrical section 51 having a smaller diameter than lip 50. Lip 50 and section 51 are connected by a frustoconical section 52 having a smaller diameter near open end 21. Section 51 is broken by an annular groove 54 having a rectangular cross section, and in which resides an O-ring 56 which slightly protrudes from the groove to form a seal against a mating face in the box connector of FIG. 1. At the open end 21 is a bevelled area 58, which forms generally the shape of a frustum of a cone and whose purpose is to facilitate insertion of pin 20 into box 14.

Referring now to FIG. 1, the generally tubular box connector 14 has a void in an annulus 61 in the shape of a cylinder and having the same diameter as that of the inside of tubular section 18 near the weld 16. The next section toward open end 15 is a larger cylindrical section 62 for receiving section 51 of pin 20. O-ring 56 seals against the inner surface of section 62 to prevent the communication of fluids between annulus 61 (or annulus 25) and the outside environment. Section 62 is followed toward end 15 by a void shaped as the frustum of a cone 64 and arranged to receive section 52 of pin 20. Next toward end 15 is a cylindrical void 66, which has three annular grooves 68, 70 and 72 for receiving the teeth defining landing shoulders on snap ring 40, which will be described in connection with FIG. 3. Section 66 also has a multiplicity of tapped holes 74 directly adjacent the grooves 68, 70 and 72 for insertion of bolts or other means to contact snap ring 40 (FIG. 2) for disconnection of casing section 10 from casing section 12 as discussed hereinafter. Nearest the open end 15 is another void 76 in the shape of a frustum of a cone, tapered with its larger diameter nearest open end 15 to facilitate insertion of pin 20 into box 14.

The outside contour of box 14 has a neck 78 of approximately the same diameter as the outside diameter of tubular section 18 and which provides means for attaching the two together with the weld material 16. The remainder of the outside contour of box 14 is an upset section 80 which extends generally from neck 78 to open end 15.

Figure 3:
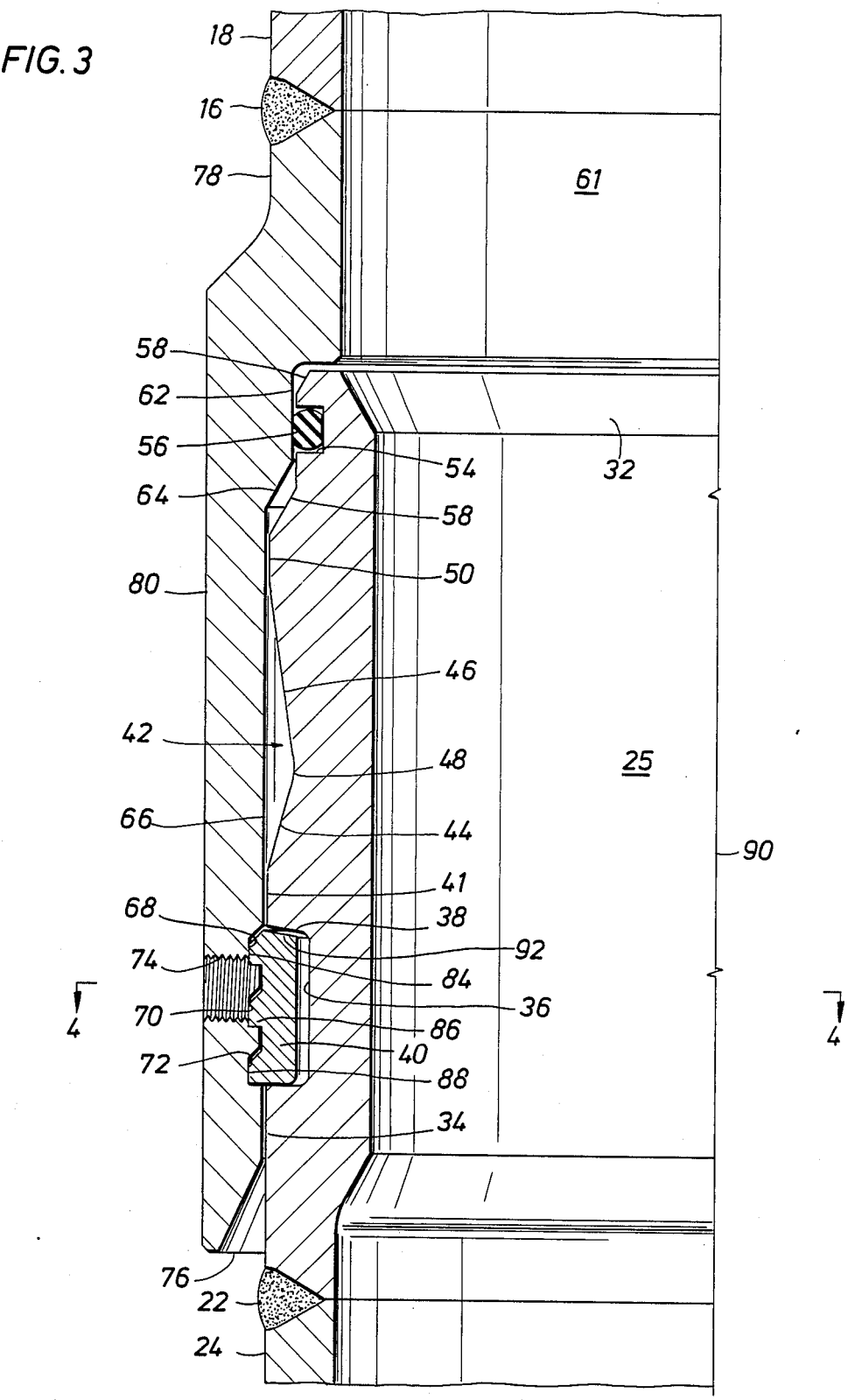
FIG. 3 is a partial longitudinal cross section of the box and pin connectors of FIGS. 1 and 2 showing them in the fully engaged and position.

Referring to FIG. 3, box 14 and pin 20 are shown fully engaged. A pressure seal to prevent the escape of fluids from the annulus 61, 25 of the casing string is provided by O-ring 56 which is positioned in rectangular groove, or recess, 54. Recess 54 is narrower than the relaxed diameter of O-ring 56 such that in the fully engaged position of box 14 and pin 20 the O-ring is compressed against cylindrical surface 62 to form a secure seal. In the engaged position recess 42 cooperates with the box section 66 to form a void between pin 20 and box 14. During insertion of the pin into the box, conical surfaces 44 and 46 may engage conical surface 76. Surface 46 is sloped such that in coordination with surface 76 insertion of pin 20 into box 14 is facilitated without the need for perfect longitudinal alignment. Once insertion is effected the reverse slope of surface 44 engages the box surface 76 to cause the pin 20 to align with box 14 as the pin moves into the box.

The pin 20 and the box 14 are mechanically secured together by means of locking ring 40 and corresponding mating grooves 68, 70 and 72. The locking ring has an axially elongate cross section and annular teeth 84, 86 and 88 along the outer edge. Each tooth has a lower edge, or landing surface, that is generally transverse to the center line 90 of the locking ring and casing. The teeth landing surfaces rest on corresponding edges or surfaces of the grooves 68, 70 and 72, respectively, in box 14. The outer edges of the teeth 84-88 are cylindrical and parallel to center line 90, while the upper edges are each sloped to form conical surfaces generally complementary to conical surfaces on the corresponding grooves 68-72. The teeth are relatively shallow compared to their width, as are the 30 grooves 68-72. The provision of a multiplicity of short teeth and grooves requires less radial space for the locking mechanism, including the ring 40 and the recess 36, without sacrificing gripping strength. This permits manufacture of a more compact and less costly connector joint. The sloped surfaces of the teeth 84-88 engage sloping surface 76 on box 14 during insertion of pin 20 into box 14 and provide means for automatically radially compressing the locking ring 40. Upon reaching grooves 68, 70 and 72 the locking ring relaxes and snaps into the recesses provided thereby, with the upper, conical teeth surfaces ratcheting over upper, conical groove surfaces until the teeth 84-88 mesh into the grooves 68-72, respectively. The bevelled upper recess surface 38 mates with a generally complementary, bevelled surface 92 at the top of the snap ring 40. The abutment of the surfaces 38 and 92 provides a wedge effect to force the locking ring 40 outwardly when tension is placed on the tubing string, thereby providing a more secure grip by teeth 84, 86 and 88 into their respective grooves 68, 70 and 72.

Figure 4:
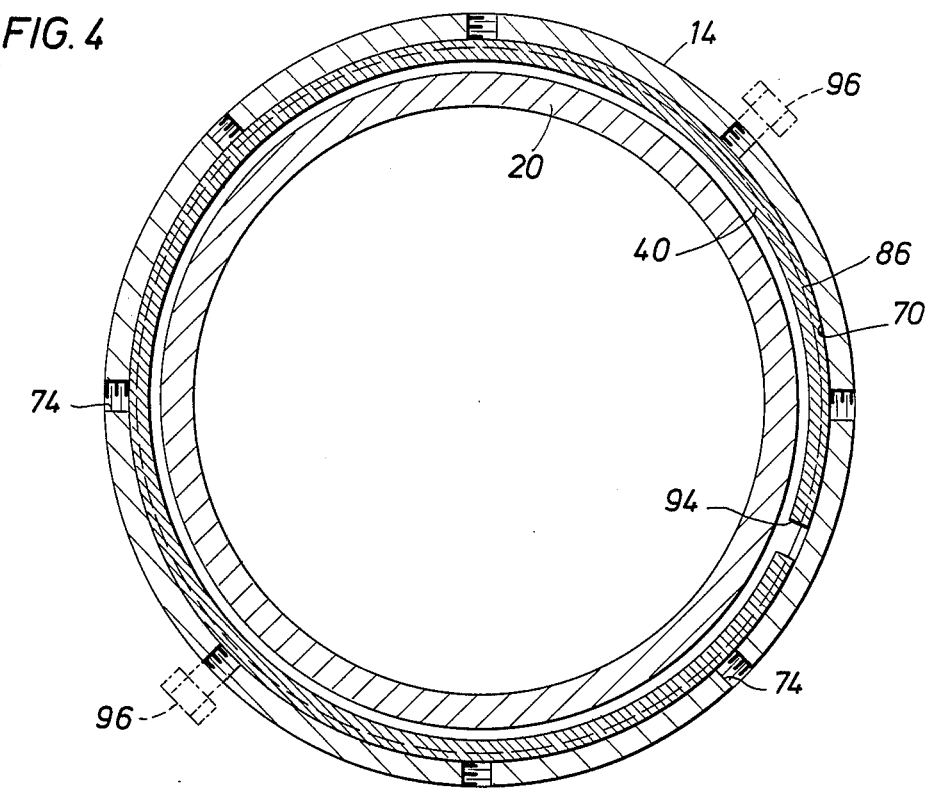
FIG. 4 is a cross section of the connectors of FIG. 3 drawn along section lines 4—4 of FIG. 3.

Referring to FIG. 4, a cross section illustrating the method of disengaging the locking ring is shown. Snap lock ring 40, having a gap 94, is shown engaged to secure pin 20 to box 14. The middle tooth 86 of locking ring 40 rests on the landing surface in middle groove 70. The tapped holes 74 drilled in the wall of box 14 intersect the two upper teeth 84 and 86 (FIG. 3). To disengage pin 20 from box 14, bolts 96, two of which are illustrated in phantom, are inserted into tapped holes 74 and are screwed down to contact locking ring 40. As the bolts are tightened the locking ring is compressed, reducing the diameter of the ring and closing gap 94. This action slides the teeth 84-88 of locking ring 40 out of the grooves 68-72, respectively, permitting the pin to be pulled longitudinally from the box without obstruction and disengaging the two sections of casing to which the box and pin are attached.

Figure 6:
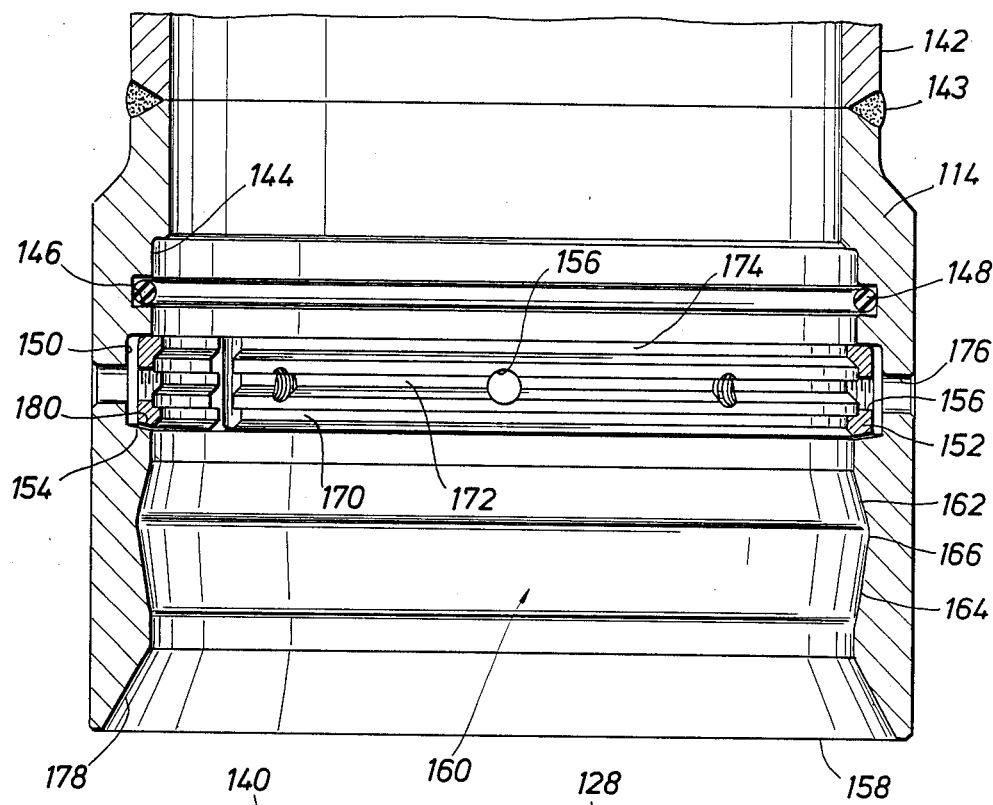
FIG. 6 is a longitudinal cross section of a box connector in accordance with a second embodiment of the invention.
Figure 7:
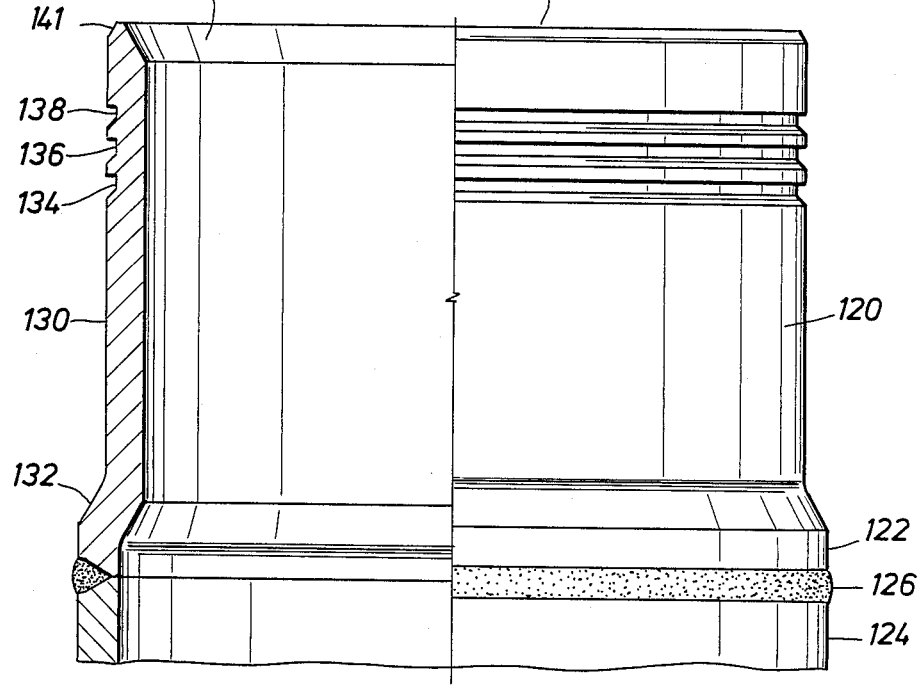
FIG. 7 is a longitudinal quarter section of a pin connector insertable in the box connector of FIG. 6.
Figure 10:
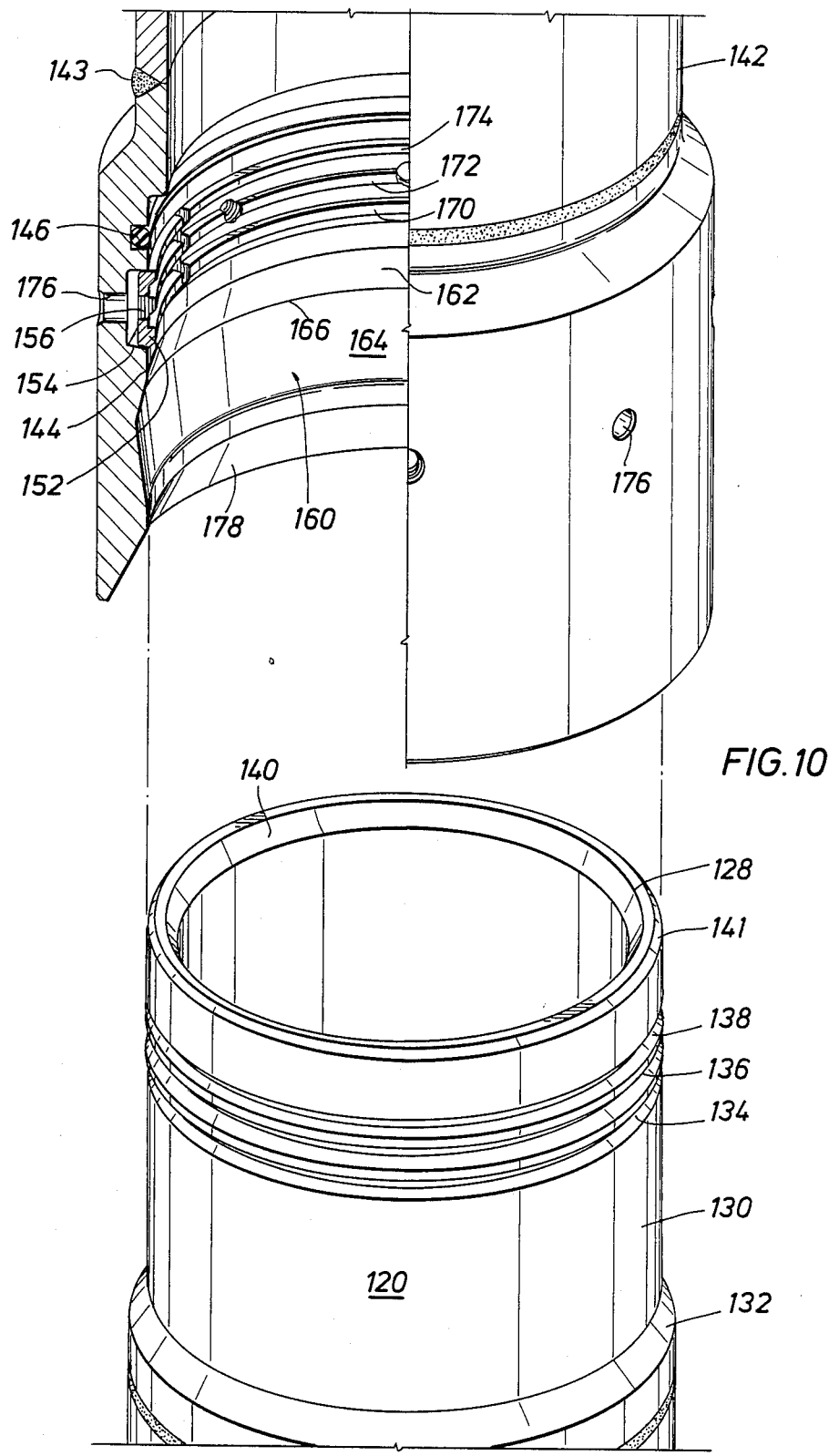
FIG. 10 is a perspective in partial longitudinal section of the box and pin connectors of FIGS. 6 and 7.

Referring now to FIGS. 6 and 7, an alternative embodiment of the present invention is shown. Reference is also made to FIG. 10 in which a perspective view of the box and pin components of FIG. 6 and 7 are shown. FIG. 6 shows a box connector 114 ready for engagement with the pin connector 120 of FIG. 7.

Referring first to FIG. 7, the pin joint 120 has a cylindrical section 122 having approximately the same diameter as and welded to cylindrical casing 124 by means of weld metal 126. Near open end 128 is a cylindrical section 130, which is smaller in diameter than section 122 and separated from it by a conical section 132. Cut into section 130 are three external annular grooves 134, 136 and 138. Each of these grooves features an annular, upwardly-facing frustoconical lower surface. The open end 128 of the pin 120 is marked by an interior, frustoconical entry section 140 surrounded by an exterior frustoconical guide section 141.

Referring again to FIG. 6, the box 114 is joined to the end of a tubular section 142 by weld 143. Cylindrical section 144 has cut therein a dove-tailed groove 146 holding disposed therein an O-ring seal 148. Below the O-ring and also in section 144 is an annular recess 150 having positioned therein a snap lock ring 152. Recess 150 has a bevelled lower annular shoulder 154. The snap lock ring 152 has a multiplicity of tapped holes 156 therein. Near open end 158 is an annular recess shown generally at 160, and formed by conical voids 162 and 164, which mutually converge with their larger diameters to form an annular, rounded rough 166. It will be appreciated that the cylindrical surface 144 is broken by the O-ring groove 146, the snap ring recess 150 and the recess 160. The two frustoconical surfaces 162 and 164 therefore originate, at their respective smallest sections, from equal diameters. Also, the height of the lower cone frustum 164 is substantially larger than that of the cone frustum 162 to facilitate the insertion of pin 120 into box 114.

Figure 8:
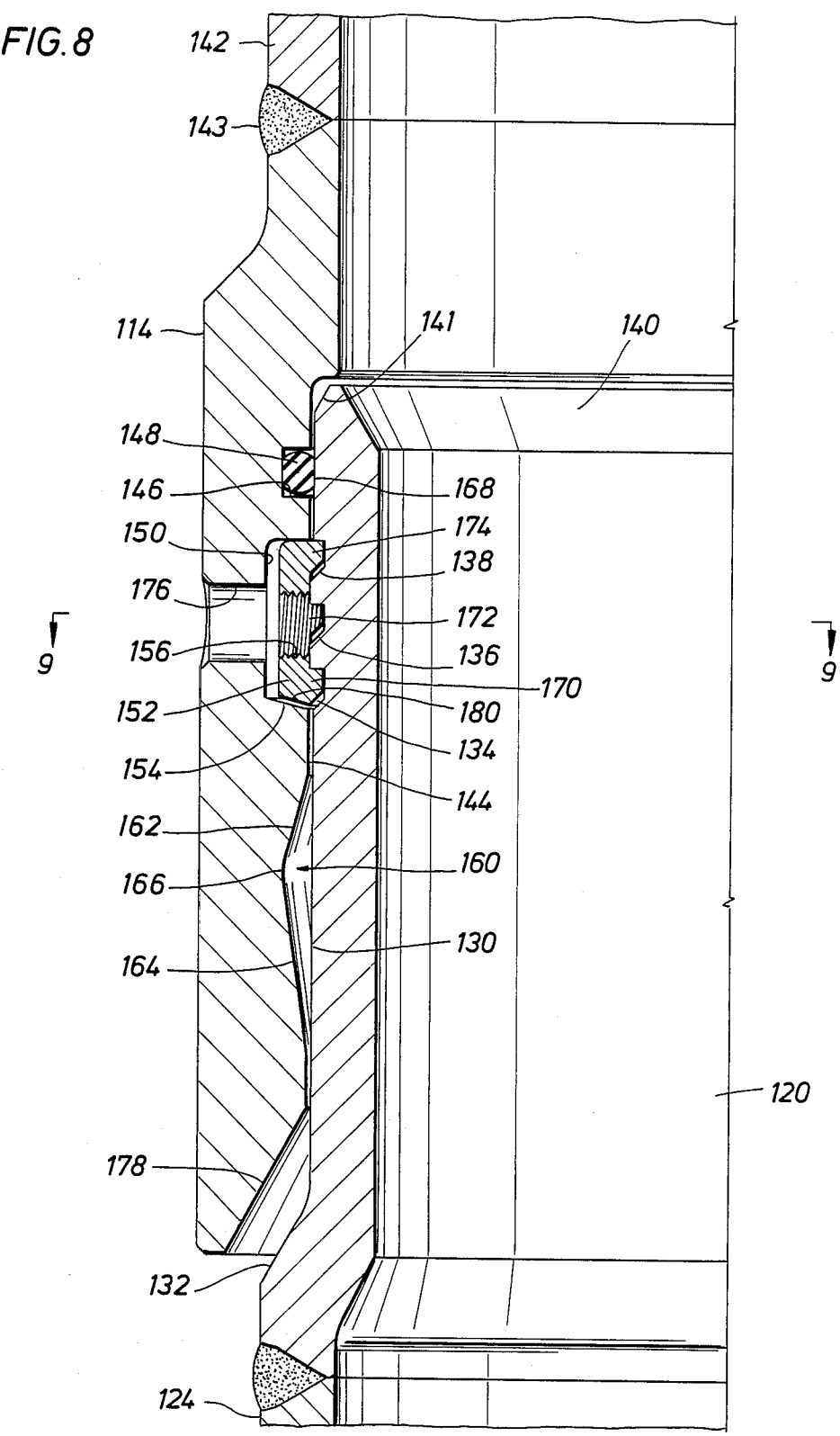
FIG. 8 is a partial longitudinal cross section of the box and pin connectors of FIGS. 6 and 7 shown in the fully engaged and locked position.

Referring now to FIG. 8, the pin 120 and box 114 are shown in their fully engaged position. O-ring seal 148, which is larger in diameter than the width of groove 146, is compressed between the back of the groove and mating face 130 on the pin 120 to form a seal that prevents the communication of fluids between the interior of the box 114 and the region exterior thereto. Snap lock ring 152 is generally rectangular in cross section and has three annular, interior teeth 170, 172 and 174 thereon. Each of the snap lock ring tapped holes 156 are directly aligned with an untapped hole 176 in box 114. Each of the box holes 176 is in communication with the recess 150 in which is positioned snap lock ring 54.

The open end 158 of the box features a frustoconical surface 178 which receives the pin guide section 141 to assist in alignment of the pin 120 and box 114. When the pin 120 is inserted into the box 114, the guide section 141 may enter the recess 160 at some angle of misalignment. Face 164 is angled to permit the entry of pin 120 even if it is not in perfect vertical or longitudinal alignment with box 114. When bevelled surface 141 reaches conical surface 162 of recess 160, the pin is automatically forced into alignment with the box. When grooves 134, 136, and 138 reach the snap lock ring 152, the bevelled lower surfaces of the grooves engage and ratchet over the matingly bevelled lower surfaces of teeth 170, 172 and 174, forcing the snap lock ring to expand so that teeth 170, 172 and 174 mesh with grooves 134, 136 and 128, respectively, to lock the box and pin together. The upper, generally annular surface of each tooth abuts the upper, annular landing surface of the corresponding groove, the groove and tooth mating landing surfaces being generally transverse to the longitudinal axes of the connectors 120 and 114, respectively. If tension is placed on the joint, the bevelled lower edge 180 of ring 152 is forced in a wedging action against sloped shoulder 154, thereby forcing the snap ring into a more secure grip with the grooves in pin 120.

Figure 9:
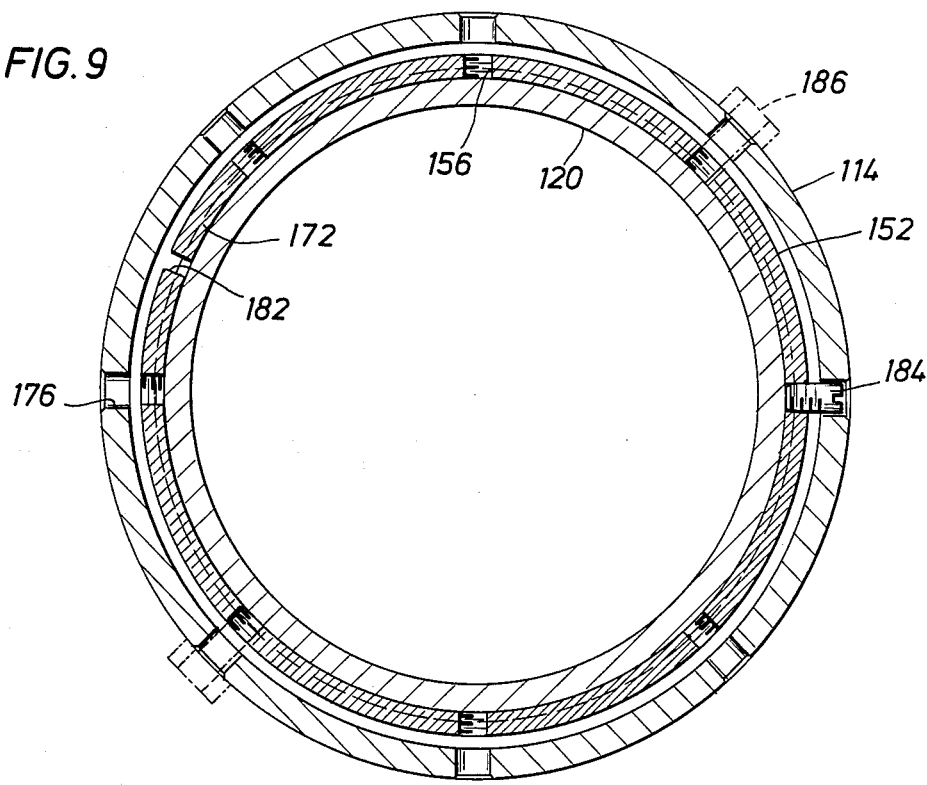
FIG. 9 is a cross section of the pin and box connectors of FIG. 8 taken along section lines 9—9 of FIG. 8.

Referring to FIG. 9, pin 120 is shown engaged with box 114 by means of locking ring 152, which has a gap 182. The middle annular tooth 172 of locking ring 152 rests on the landing surface of middle groove 136. In one of the snap lock holes 156 is threaded a set screw 184, which extends into the adjacent box hole 176 and maintains all the snap lock holes 156 and box holes 176 in alignment. Threaded bolts 186 (two shown in phantom) may be inserted in the remaining box holes 176 and screwed into the tapped holes 156. When bolts 186 are turned to the point that their heads abut box 114, the screws expand lock ring 154 on further advancement, removing the teeth of the locking ring from the grooves in pin 120, thereby permitting the pin and box to be disengaged.

The present invention provides a quick-connect connector assembly and technique that automatically aligns the connector members, and tubing attached thereto, as the mating connectors are joined. The annular recess of the pin or box connector receiving and guiding the opposite box or pin connector, respectively, effects the mutual connector alignment although the two connector members may have been considerably misaligned on initiation of insertion of the pin into the box. The snap lock ring may include any number of generally annular teeth, with a matching number of grooves being provided, it being appreciated that the greater the number of tooth-and-groove combinations provided the greater will be the number of abutting landing surfaces to maintain the pin and box mutually locked. Consequently, increased latching capability results from a larger number of meshed teeth of a given size. Also, the size of the teeth and that of the grooves may be reduced as the number of teeth increases, allowing greater radial wall thickness of the snap lock ring and the connector tubular members and maintaining or increasing the structural strength of the two connector members.

The combination of an aligning annular recess, such as 42 or 160 described and illustrated herein, and a snap lock ring may be placed on one or the other of the connector members, or the combination may be distributed between connector members. Thus, a pin with such an aligning recess may be connected to a box carrying a snap lock ring which meshes with grooves in the pin. A box featuring an aligning recess may be connected to a pin carrying a snap lock ring which meshes with grooves in the box.

While particular embodiments of the present invention and the method of use and operation thereof have been shown and described, it will be appreciated that changes may be made therein without departing from the true scope and spirit of the invention. It is the intention in the appended claims to cover all such changes and modifications.

I claim:

1. Apparatus for making a connection between tubular members comprising:
   a. a first generally tubular connector member;
   b. a second generally tubular connector member for positioning generally inside the first;
   c. said first and second connector members being shaped to provide a concavity therebetween when said second member is positioned inside said first member, said concavity being elongate in cross section and having two oppositely sloping surfaces whereby said second member may be initially inserted in said first member without substantial longitudinal alignment therebetween, and whereby the shape of said concavity may force said connector members into mutual longitudinal alignment upon further insertion of said second member into said first member; and
   d. means for securing said first member to said second member, including a plurality of generally annular grooves in one member, defining a landing surface as part of each groove, and a snap lock ring carried in a generally annular recess in the other member, said snap lock ring comprising a plurality of generally annular teeth defining a landing surface as part of each tooth, whereby said teeth may mesh with said grooves so that individual tooth landing surfaces may abut individual groove landing surfaces to lock together said first and second members in a locking configuration.

2. Apparatus in accordance with claim 1 wherein said oppositely sloping surfaces comprise two frustra of cones originating from generally equal diameters.

3. Apparatus for making a connection between tubular members comprising:
   a. a firs generally tubular connector member;
   b. a second generally tubular connector member for positioning generally inside the first;
   c. said first and second connector members being shaped to provide a concavity therebetween when said second member is positioned inside said first member, wherein the inner surface of said concavity is generally elongate and comprises two cone frustra originating from generally equal diameters whereby said second member may be initially inserted in said first member without substantial longitudinal alignment therebetween, and whereby the shape of said concavity may force said connector members into mutual longitudinal alignment upon further insertion of said second member into said first member; and d. means for securing said first member to said second member, including a plurality of generally annular grooves in one member, defining a landing surface as part of each groove, and a snap lock ring carried in a generally annular recess in the other member, said snap lock ring comprising a plurality of generally annular teeth defining a landing surface as part of each tooth, whereby said teeth may mesh with said grooves so that individual tooth landing surfaces may abut individual groove landing surfaces to lock together said first and second members in a locking configuration.

4. Apparatus for making a connection between tubular members comprising:

a. a first generally tubular connector member;

b. a second generally tubular connector member for positioning generally inside the first;

c. said first and second connector members being shaped to provide a concavity therebetween when said second member is positioned inside said first member, wherein said concavity is provided at least by an elongate recess in one or the other of said connector members, the surface of said recess including two frustra of cones, said frustoconical surface closer to the end of said connector member permitting initial insertion of said second member in said first member without substantial longitudinal alignment therebetween, and said frustoconical surface farther from said end of said connector member able to interact with the end of the other of said connector members to force mutual longitudinal alignment between said first and second connector members upon further insertion of said second member into said first member; and d. means for securing said first member to said second member, including a plurality of generally annular grooves in one member, defining a landing surface as part of each groove, and a snap lock ring carried in a generally annular recess in the other member, said snap lock ring comprising a plurality of generally annular teeth defining a landing surface as part of each tooth, whereby said teeth may mesh with said grooves so that individual tooth landing surfaces may abut individual groove landing surfaces to lock together said first and second members in a locking configuration.

5. Apparatus in accordance with any of claims 1, 3 or wherein the outside periphery of the end of said second member is beveled.

6. Apparatus in accordance with claim 5 wherein the inner periphery of the end of said first member is beveled.

7. Apparatus in accordance with any of claims 1, 3 or further comprising an annular recess between said first and second members and O-ring seal means positioned in said recess.

8. Apparatus in accordance with any of claims 1, 3 or 4 wherein said snap lock ring is elongate generally in the direction of the axis of the first and second members and said teeth are shallow relative to their width.

9. Apparatus in accordance with any of claims 1, 3 or 4 wherein said recess carrying said snap lock ring and said snap lock ring include mutually complimentary beveled surfaces whereby, with said teeth and grooves in said locking configuration, tension applied to said first and second members may produce a wedging effect between said beveled surfaces to urge said teeth farther into meshing engagement with said grooves.

10. Apparatus in accordance with any of claims 1, 3 or 4 further including means for disengaging said snap lock ring from engagement with said multiplicity of grooves whereby the first and second connector members may be separated.

11. Apparatus in accordance with claim 10 wherein said disengaging means comprises a multiplicity of holes about the periphery of said first connector member for receiving a multiplicity of threaded bolts for engagement with said snap lock ring.

12. Apparatus in accordance with any of claims 1, 3 or 4 wherein:

a. said first connector member comprises a box-type point, said grooves being provided therewithin; and b. said second connector member comprises a pin-type joint carrying said snap lock ring in said generally annular recess;

c. wherein said snap lock ring is generally contractible.

13. Apparatus in accordance with claim 12 wherein said concavity comprises an elongate recess on the outside periphery of said pin-type joint.

14. Apparatus in accordance with claim 12 further comprising means for selectively compressing said snap lock ring, whereby the first and second tubular members may be mutually disengaged.

15. Apparatus in accordance with any of claims 1, 3 or 4 wherein:

a. said first connector member comprises a box-type point carrying said snap lock ring in said generally annular recess; and b. said second connector member comprises a pin-type point, said grooves being provided thereon;

wherein said snap lock ring is generally expandable.

16. Apparatus in accordance with claim 15 wherein said concavity comprises an elongate recess on the inside of said box-type joint.

17. Apparatus in accordance with claim 15 further comprising means for selectively expanding said snap lock ring, whereby the first and second tubular members may be mutually disengaged.

* * * * *

UNITED STATES PATENT AND TRADEMARK OFFICE
CERTIFICATE OF CORRECTION

PATENT NO. : 4,830,408
DATED : May 16, 1989
INVENTOR(S) : Larry E. Reimert

It is certified that error appears in the above-identified patent and that said Letters Patent is hereby corrected as shown below:

Column 8, line 56, delete "firs" and insert therefor --first--.

Column 9, line 50, after "or" insert --4--.

Column 9, line 56, after "or" insert --4--.

Column 10, line 28, delete "point" and insert therefor --joint--.

Column 10, line 45, delete "point" and insert therefor --joint--.

Column 10, line 48, delete "point" and insert therefor --joint--.

Signed and Sealed this

Twenty-third Day of January, 1990

*Attest:*

JEFFREY M. SAMUELS

*Attesting Officer*     *Acting Commissioner of Patents and Trademarks*